(12) United States Patent
Sand et al.

(10) Patent No.: US 9,193,411 B2
(45) Date of Patent: Nov. 24, 2015

(54) INTEGRATED CAST MOTORCYCLE CHASSIS AND MOTOR HOUSING

(71) Applicant: Faster Faster Inc., San Francisco, CA (US)

(72) Inventors: Jeff Sand, San Francisco, CA (US); Derek Dorresteyn, Mill Valley, CA (US); David John Drennan, San Francisco, CA (US)

(73) Assignee: Faster Faster, Inc., San Francisco, CA (US)

( * ) Notice: Subject to any disclaimer, the term of this patent is extended or adjusted under 35 U.S.C. 154(b) by 0 days.

(21) Appl. No.: 14/171,485

(22) Filed: Feb. 3, 2014

(65) Prior Publication Data

US 2014/0209402 A1    Jul. 31, 2014

Related U.S. Application Data

(63) Continuation of application No. 13/196,534, filed on Aug. 2, 2011, now Pat. No. 8,672,077.

(51) Int. Cl.
| | |
|---|---|
| *B62K 11/04* | (2006.01) |
| *B62K 19/12* | (2006.01) |
| *B22D 21/00* | (2006.01) |
| *B22D 21/04* | (2006.01) |
| *B62K 19/16* | (2006.01) |
| *C22C 21/00* | (2006.01) |

(52) U.S. Cl.
CPC ............ *B62K 11/04* (2013.01); *B22D 21/007* (2013.01); *B22D 21/04* (2013.01); *B62K 19/12* (2013.01); *B62K 19/16* (2013.01); *C22C 21/00* (2013.01); *B62K 2204/00* (2013.01)

(58) Field of Classification Search
CPC ............................ B62K 2204/00; B62K 19/16
USPC ......................................................... 180/220
See application file for complete search history.

(56) References Cited

U.S. PATENT DOCUMENTS

| 1,547,157 | A | | 7/1925 | Neracher |
| 2,915,167 | A | * | 12/1959 | Berger .......................... 198/788 |
| 4,696,363 | A | | 9/1987 | Enda |
| 5,042,609 | A | | 8/1991 | Krispler et al. |
| 5,360,078 | A | | 11/1994 | Rifenburg et al. |
| 5,501,292 | A | | 3/1996 | Kawashima et al. |
| 6,601,666 | B2 | | 8/2003 | Okuma |
| 6,764,430 | B1 | * | 7/2004 | Fencel ............................. 482/54 |

(Continued)

FOREIGN PATENT DOCUMENTS

| EP | 0469995 A1 | 2/1992 |
| EP | 2143627 A2 | 1/2010 |
| JP | 5-105176 | 4/1993 |

OTHER PUBLICATIONS

PCT International Search Report and Written Opinion, PCT Application No. PCT/US2012/048852, Oct. 10, 2012, 13 pages.

(Continued)

*Primary Examiner* — Tony Winner
(74) *Attorney, Agent, or Firm* — Fenwick & West LLP

(57) ABSTRACT

An electric motorcycle frame for an electric motorcycle is disclosed. The electric motorcycle frame comprises side structures including openings. A torsion tube configured to house an electric motor is connected to the openings of the side structures and the torsion tube is a stressed member of the electric motorcycle frame.

15 Claims, 9 Drawing Sheets

(56) References Cited

U.S. PATENT DOCUMENTS

| | | | |
|---|---|---|---|
| 6,837,328 B2 | 1/2005 | Neugebauer et al. | |
| 7,299,915 B2 * | 11/2007 | El-Ibiary | 198/788 |
| 8,312,954 B2 | 11/2012 | Johnson et al. | |
| 8,397,854 B1 * | 3/2013 | Nam et al. | 180/213 |
| 2010/0018787 A1 | 1/2010 | Plazotta et al. | |
| 2011/0036657 A1 | 2/2011 | Bland et al. | |
| 2011/0175467 A1 | 7/2011 | Belton | |
| 2013/0281249 A1 * | 10/2013 | Mimura | 475/150 |

OTHER PUBLICATIONS

United States Office Action, U.S. Appl. No. 13/196,534, May 24, 2013, 8 pages.

European Extended Search Report, European Application No. 12819194.7, Feb. 23, 2015, 7 pages.

* cited by examiner

INTEGRATED CAST MOTORCYCLE CHASSIS AND MOTOR HOUSING

CROSS-REFERENCE TO RELATED APPLICATIONS

This application is a continuation of U.S. patent application Ser. No. 13/196,534, filed on Aug. 2, 2011, which is incorporated by reference in its entirety.

FIELD

The invention relates to vehicles, and, more particularly to electric motorcycle frames.

BACKGROUND

Recent advances in electric vehicle technology have resulted vehicles that have comparable performance characteristics compared to internal combustion engine vehicles. Unfortunately, one key component, the battery, remains stubbornly expensive, resulting in costly electric cars. One cannot possibly justify the price of a new electric car compared to a similarly equipment gasoline or diesel model. If, instead, one develops the lightest possible vehicle, the electric equation just might make sense.

The lightest practical vehicle is either a motocross bike, a street legal equivalent, the enduro, or it's fully street focused version, the supermoto. Such bikes often weigh a little over 100 kg. By minimizing weight, the battery requirements are minimized, and, consequently, the price as well.

Several companies have seen the light and jumped into the fray. Unfortunately, their efforts have come up short. Many save the expense of designing a new chassis from scratch, and, instead, shoehorn an electric motor and battery pack in a frame that was originally designed for and internal combustion engine. The results have been mediocre, underpowered bikes with limited range and questionable handling.

The published U.S. patent application 2011/0036657 A1 by Bland et al. (subsequently referred to as Bland) assigned to Brammo Inc. discloses a straight electric motorcycle chassis that comprises two sides that enclose the headstock and allow attachment of batteries from above and below. Bland places the motor at the axis of the drive sprocket, with no transmission, subsequently requiring a big, heavy electric motor to generate enough torque. The motor is also fully stressed, resulting in high maintenance costs related to motor repair or replacement. In addition, the batteries are insufficient for a reasonable top speed and range. Zero Motorcycles, from Scotts Valley, Calif., manufactures an electric motorcycle frame using a combination of tubular and hydroformed aluminum pieces that are welded together. The myriad disadvantages of welded aluminum frames are discussed in the description, below. Like the teachings of Bland, the Zero batteries are insufficient for a reasonable top speed and range.

KTM of Austria and Quantya of Switzerland both employ welded bent steel tube perimeter frames, which can be heavy.

All of the electric motorcycle manufacturers discussed above use air cooled electric motors. Compared to liquid cooled electric motors, air cooled electric motors have lower peak power outputs and vastly lower continuous power outputs.

Given growing consumer demand for high performance, low cost electric vehicles, there is a need for a new electric motorcycle developed around a new type of chassis.

SUMMARY

The current invention relates to a vehicle frame, or chassis, and its manufacture. In one embodiment the frame comprises two cast aluminum structures that can be bolted together. The frame structures can each be cast in one piece and finish machined with one fixturing. The frame casting can include an integral motor housing that may be fully stressed and act as a torsion tube.

DESCRIPTION

Figure 1:
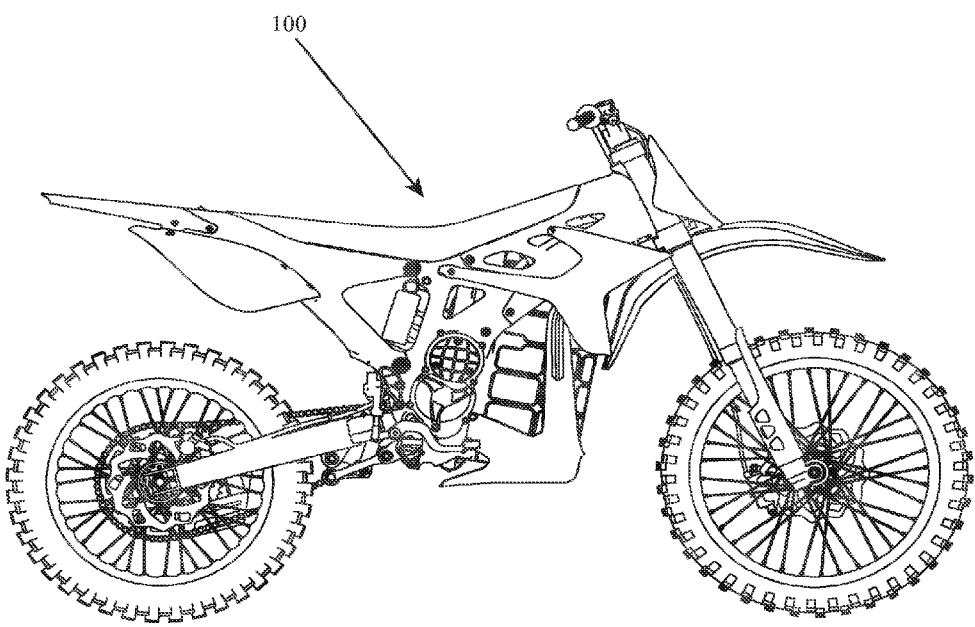
FIG. 1 shows a motorcycle.

FIG. 1 shows a motorcycle 100. The motorcycle 100 shown is an off road or motocross bike. Motorcycles 100 comprise motocross bikes, road bikes, three wheeled bikes, and four wheeled bikes. Any three or four wheeled vehicle where the rider straddles the seat 114 of the vehicle is considered a motorcycle. Scooters are also considered motorcycles. The motorcycle 100 shown in FIG. 1 comprises an electric motorcycle, and, therefore has an electric motor and a battery box 112.

Figure 2:
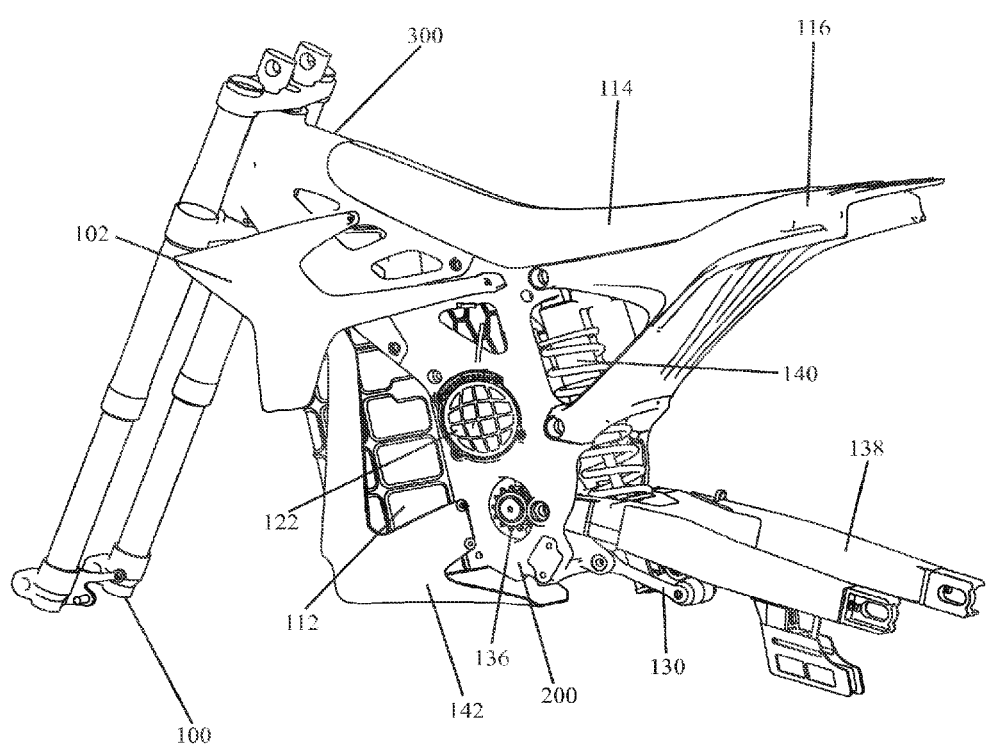
FIG. 2 shows motorcycle parts that attach to a motorcycle frame.

FIG. 2 shows motorcycle parts that attach to a motorcycle frame 144. Shown are a shroud 102, also known as a fairing, a seat 114, a rear subframe 116, a rear shock 140, a swing arm 138, a rear suspension linkage 130, a skid plate 142, a battery box 112, a motor cover 122, a sprocket 136, and a fork 134. Also shown are the frame structure 200 and the second frame structure 300.

Figure 3:
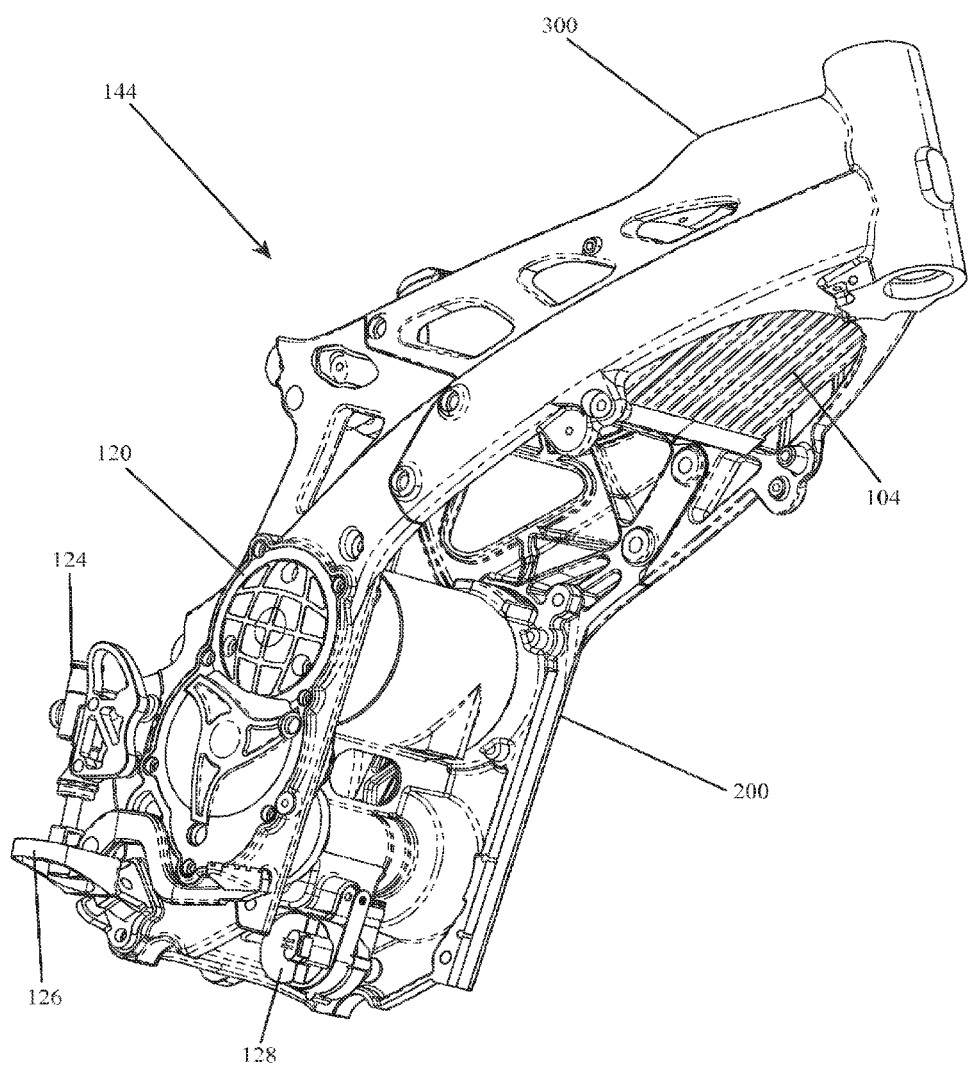
FIG. 3 shows motorcycle parts that attach to a motorcycle frame.

FIG. 3 shows motorcycle parts that attach to a motorcycle frame 144. Shown are a radiator 104, a water pump 128, a footpeg 126, a rear master cylinder 124, and a gear cover 120. Also shown are the frame structure 200 and the second frame structure 300.

A frame 144 for a motorcycle can be made as a single piece or several pieces that are attached together. The example frame 144 shown in FIGS. 2-3 is a two piece frame 144 comprising the frame structure 200, also known as a rear bulkhead, and the second frame structure 300, also known as a front bulkhead. The two piece frame 144 design allows the frame structure 200 and the second frame structure 300 to each be cast as a single piece, finish machined in one fixture, and attached together.

Using only one fixture per structure reduces time required for machining and increases accuracy of the machined surfaces. Milling machines large enough for a single structure can be cost prohibitive. Utilizing two structures, rather than a single structure, reduces the size of milling machine required to complete the operation, reducing capital costs. In addition, separating the structure into two pieces can allow machine access to additional areas of the casting, allowing more features to be integrated and reducing the complexity of fixturing and machining. Casting a single frame unit may also be quite complicated and more costly that two smaller frame castings.

A typical 3-axis milling machine setup involves clamping the workpiece in a vise where only one face is exposed for cutting at a time. A 4-axis mill setup clamps the workpiece in a rotary fixture. This allows the machine to work on virtually all faces of the workpiece that are perpendicular to the axis of rotation. Thus, by using a 4-axis milling machine, such as a horizontal milling machine with a rotary axis for the workpiece fixture, one can finish machine all of the features, or interface areas, within the tolerance specification for the frame structure 200 and the second frame structure 300 listed below and seen in FIGS. 4-9 with one fixturing per piece, each saving considerable time and expense.

In one embodiment, the frame 144 may be manufactured by casting both the frame structure 200 and the second frame structure 300 each as a single casting from 206 aluminum alloy. The frame structure 200 and the second frame structure 300 castings are then separately mounted in respective fixtures and features are finish machined in at least one working plane. 206 aluminum has some corrosion issues, so conversion coating, a process including an acid dip and passivation, followed by priming and painting would resolve those issues. Other suitable casting aluminum alloys include 201, 204, 356, and 357. In another embodiment, a one piece frame may be manufactured by casting the frame 144 as a single casting with most or all of the features and mounting points included in FIGS. 2-8 and then finish machined. In yet another embodiment, the frame structure 200 may be cast and finish machined as described above, while the second frame structure 300 may be fabricated in another manner, such as milled from billet aluminum or created by welding two or more parts together. Welding allows one to build a trellis frame structure out of steel, titanium, or aluminum or to build a twin spar aluminum frame structure commonly used for motorcycles. Alternatively, the second frame structure 300 may be built out of a composite material such as carbon fiber.

The embodiment of the frame 144 shown in FIG. 3 with the frame structure 200 and the second frame structure 300 comprises a weldless design. Welding frame components can take a considerable amount to time to accurately fixture and weld together. Welding adds expense due to inconsistencies in weld quality that require a safety margin or more robust and heavy structure to compensate for these inconsistencies. Welding can also result in stress build up and distortion in a structure requiring secondary heat treatment and straightening.

Figure 4:
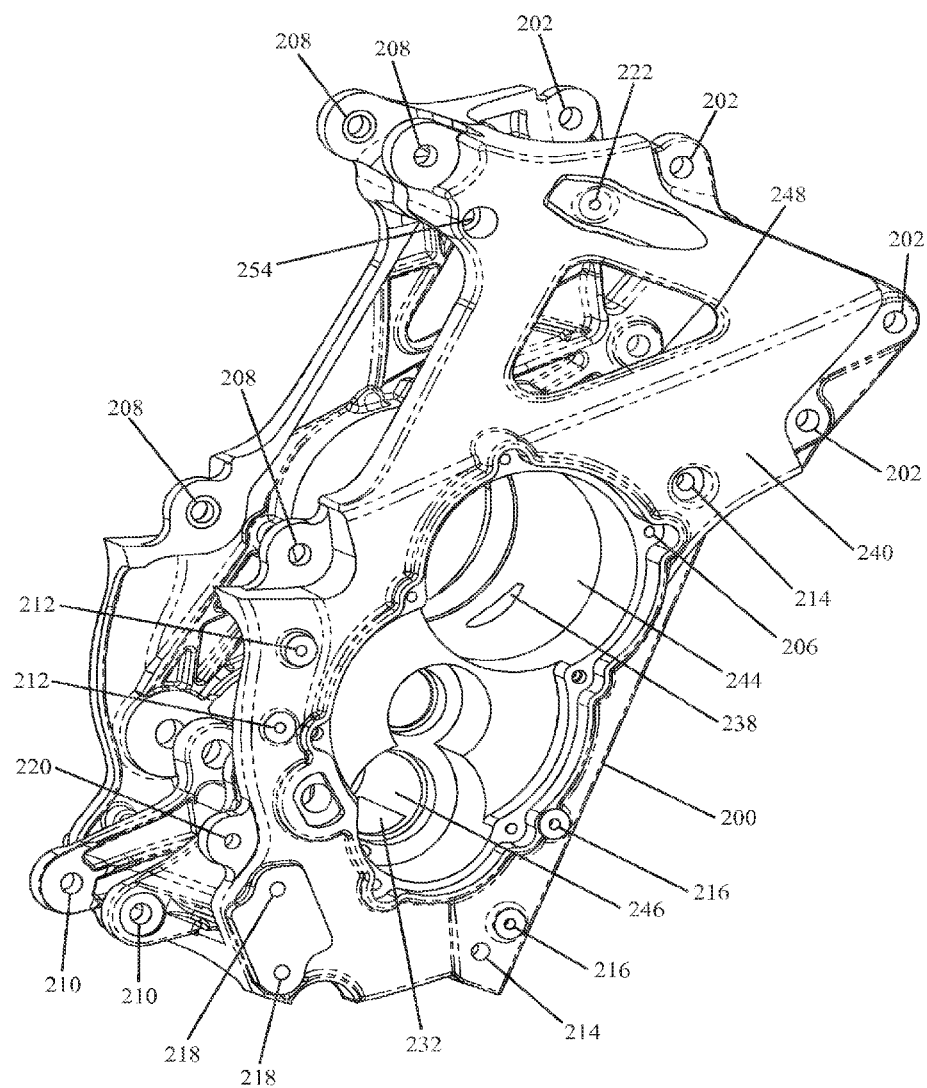
FIG. 4 shows a rear part of a motorcycle frame.

FIG. 4 shows a rear part of a motorcycle frame 144. The frame structure 200 includes frame mounts 202, a gear cover mount 206, rear subframe mounts 208, linkage mounts 210, rear master cylinder mounts 212, battery bolt holes 214, skid plate mounts 216, footpeg mounts 218, a rear brake lever mount 220, shroud mounts 222, a bottom coolant port 238, an oil sump 232, a right side 240, a motor housing 244, an output shaft housing 246, a vent hole 248, and a shock mount bolt hole 254.

Figure 5:
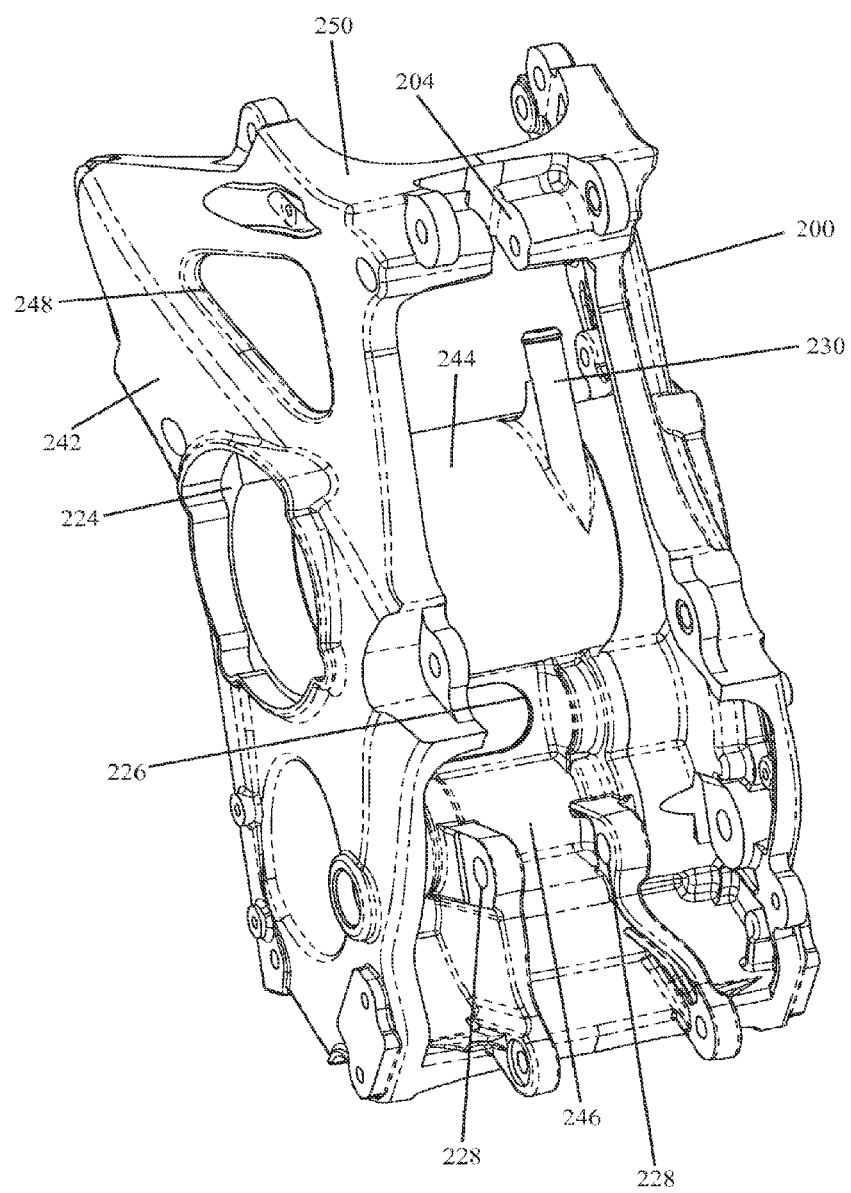
FIG. 5 shows a rear part of a motorcycle frame.

FIG. 5 shows a rear part of a motorcycle frame 144. The frame structure 200 includes shock mounts 204, a motor cover mount 224, a pass through hole 226, swing arm mounts 228, a top coolant port 230, a left side 242, a motor housing 244, an output shaft housing 246, a vent hole 248, and a structural rib 250.

The left and right sides 242, 240 shown in FIGS. 4, 5 are a type of side structure that connects the motor housing 244, which may act as a torsion tube, to mounting points for other components or to other frame features. The sides 242, 240 are shown as part of a single casting, but may also be a welded trellis structure or a composite structure. It is also possible to use only one side structure in the middle of the frame to connect the motor housing 244 to other features and mounting points.

Figure 6:
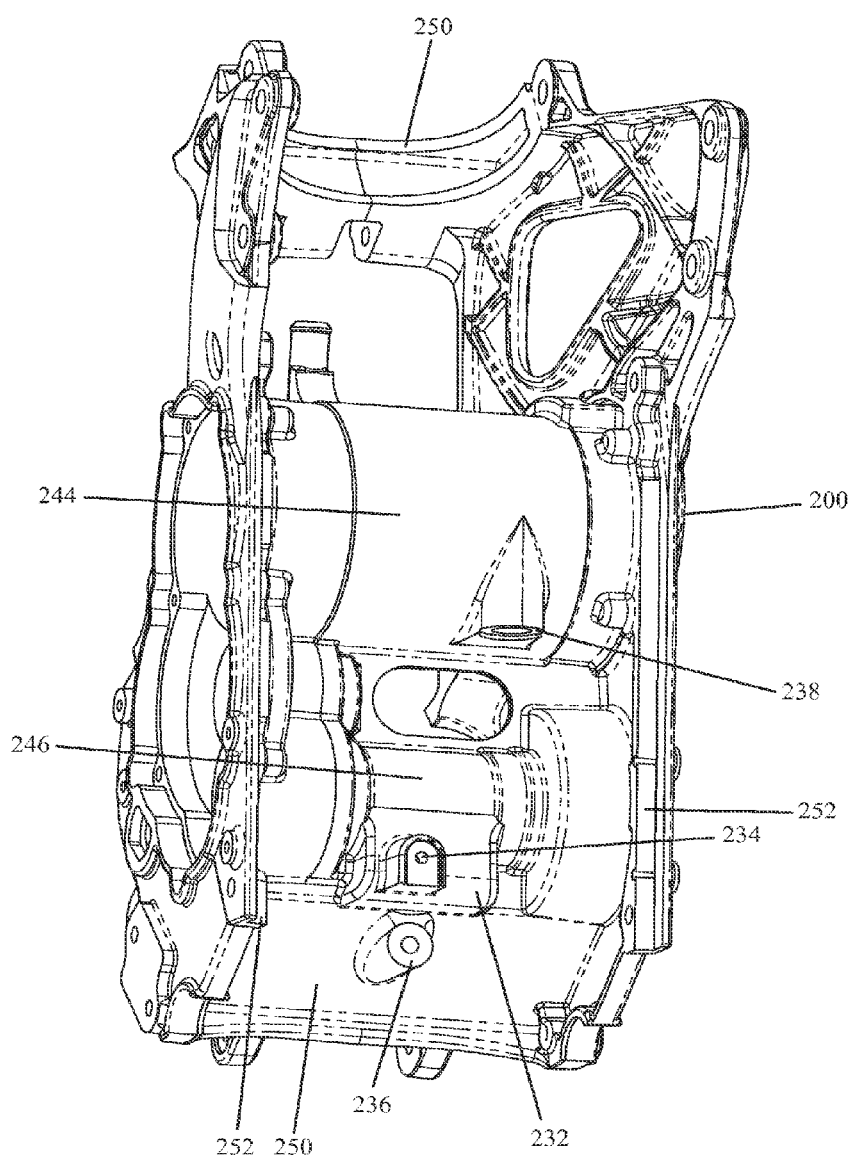
FIG. 6 shows a rear part of a motorcycle frame.

FIG. 6 shows a rear part of a motorcycle frame 144. The frame structure 200 includes an oil sump 232, a drain plug port 234, a bottom coolant port 238, a motor housing 244, an output shaft housing 246, structural ribs 250, and battery box mounts 252.

Figure 7:
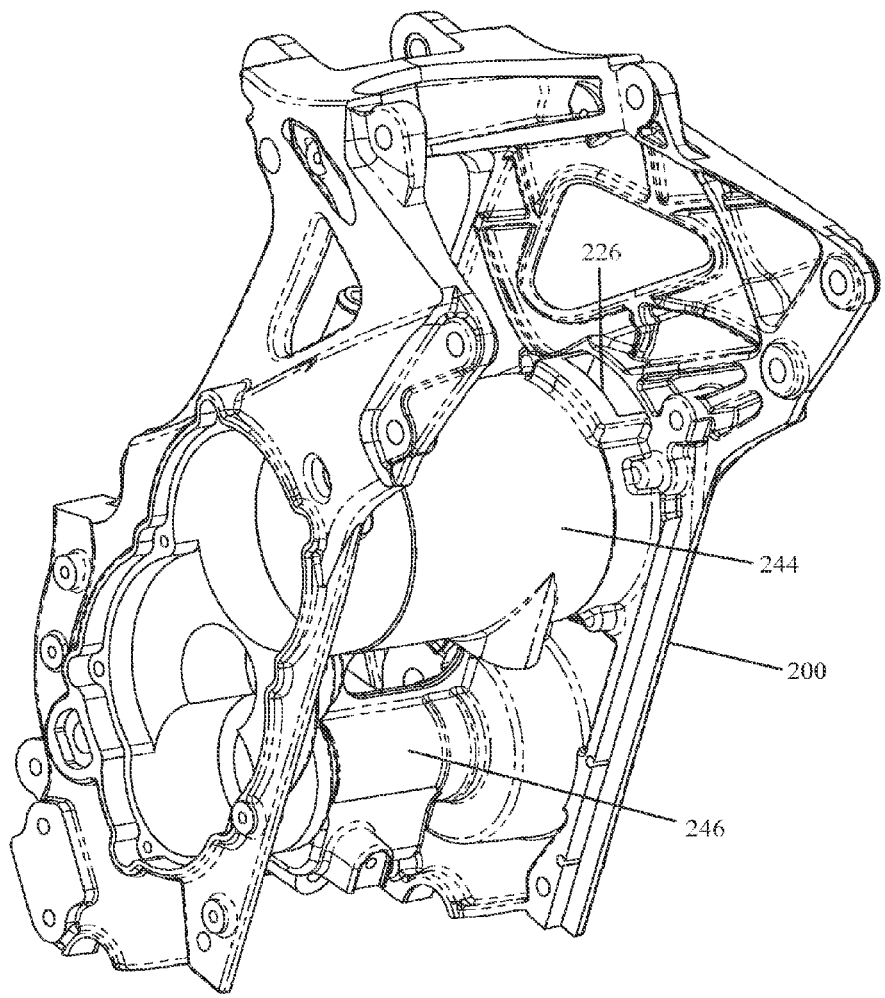
FIG. 7 shows a rear part of a motorcycle frame.

FIG. 7 shows a rear part of a motorcycle frame 144. The frame structure 200 includes a pass through hole 226, a motor housing 244, and an output shaft housing 246.

The left side 242 and right side 240 of the frame structure 200 flank the motor housing 244 and output shaft housing 246. The housings 244, 246 may extend beyond the external wall of the sides 240, 242, or the housings 244, 246 may be contained by the sides 240, 242. Alternately, one or more sides may be connected to the middle of the housings 244, 246. The housings 244, 246 may be fully stressed and may act as torsion tubes to add rigidity to the frame structure 200. Cylinders are the best structure to use for a torsion tube due to its polar moment of inertia, but other shapes can be used if appropriate. The motor housing 244 be designed to receive a motor, preferably a liquid cooled electric motor. The housing 244 may have a top coolant port 230 and a bottom coolant port 238 to allow the circulation of a coolant between the motor housing 244 and the motor.

When the motor housing 244 is used as an outer water jacket for containing coolant between itself and the motor, the motor can be contained by an inner water jacket. In this case, the motor and the inner water jacket are not required to be stressed members, while the motor housing 244 may be fully stressed.

A motor cover 122 may be attached to a motor cover mount 224 on the frame structure 200 in order to seal the motor from the elements. Likewise, a gear cover 120 may be attached to a gear cover mount 206 in order to seal the motor and/or gear reduction assembly from the elements. A shroud 102 or fairing may be attached to shroud mounts 216, 304. A seat 114 may be attached to seat plate mounts 324 via a seat clip and to the rear subframe 116. The rear subframe 116 may be attached to rear subframe mounts 208. A rear shock 140 may be attached to shock mounts 204. A swing arm 138 may be attached to swing arm mounts 228. Rear suspension linkages 130 may be attached to linkage mounts 210.

A skid plate 142 may be attached to skid plate mounts 216 in order to protect the a battery box 112. A battery box 112 may be attached to battery box mounts 252 and secured with bolts passing through the battery bolt holes 214. Any feature that generally aids in the attachment of the battery box 112 to the frame 144 may be generally referred to as a battery box mount. The battery box 112 may be a semi stressed member when attached to the frame structure 200, thereby adding rigidity to the frame 144 when attached while being removable without compromising the structural integrity of the frame 144 or having the rest of the motorcycle 100 lay in pieces when the battery box 112 is removed, as would be the case if the battery box 112 where fully stressed. A sprocket 136 may drive a chain to drive the rear wheel and may also be attached to an output shaft that is housed in the output shaft housing 246.

One or more pass through holes 226, or openings, may be used to allow passage of hoses and wires. Adding a pass through hole 226 on the motor housing 244, as seen in FIG. 7, allows the wires that power the motor to be routed internally in the frame 144, a more attractive and safer solution than routing power wires externally. An o-ring or equivalent seal between the motor housing 244 and the motor can prevent coolant from entering the chamber where the power wires connect to the motor. A rubber gasket or equivalent is preferably set in the pass through hole 226 to form a seal between the motor housing 244 and the wires and to provide strain relief.

One or more vent holes 248, 308 allow air to flow through the radiator 104 and to exit the frame 144. One or more structural ribs 250 may be added to the frame structure 200 to increase rigidity.

An oil sump 232 may be placed in the output shaft housing 246 to provide lubrication for a gear reduction. The oil sump 232 can be drained via a drain plug port 234. An oil level sight and oil fill port may be integrated into the gear cover 120. A water pump 128 may be attached to a water pump mount 236, the water pump 128 circulating a coolant to the motor and optionally to the motor control unit and the battery.

Figure 8:
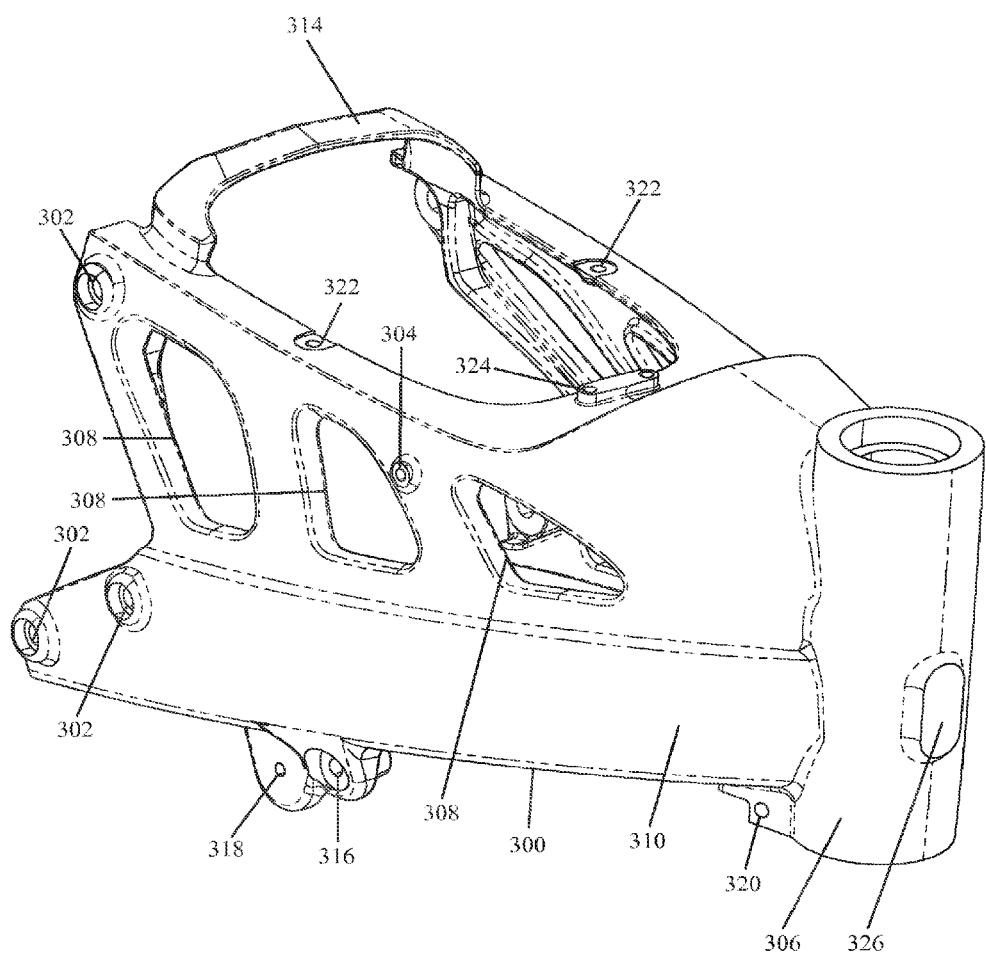
FIG. 8 shows a front part of a motorcycle frame.

FIG. 8 shows a front part of a motorcycle frame 144. The second frame structure 300 includes frame mounts 302, shroud mounts 304, a headstock structure 306, vent holes 308, a right side 310, a structural rib 314, battery box mounts 316, skid plate mounts 318, steering stop mounts 320, radiator mounts 322, seat plate mounts 324, and a mounting plane 326. The headstock structure 306 is designed for receiving a fork 134. The headstock structure 306 may be a tube as shown in FIG. 8 or any other structure that holds upper and lower bearings that receive a fork 134. A box construction type headstock structure 306 may be used to allow greater airflow through the front of the motorcycle 100.

Figure 9:
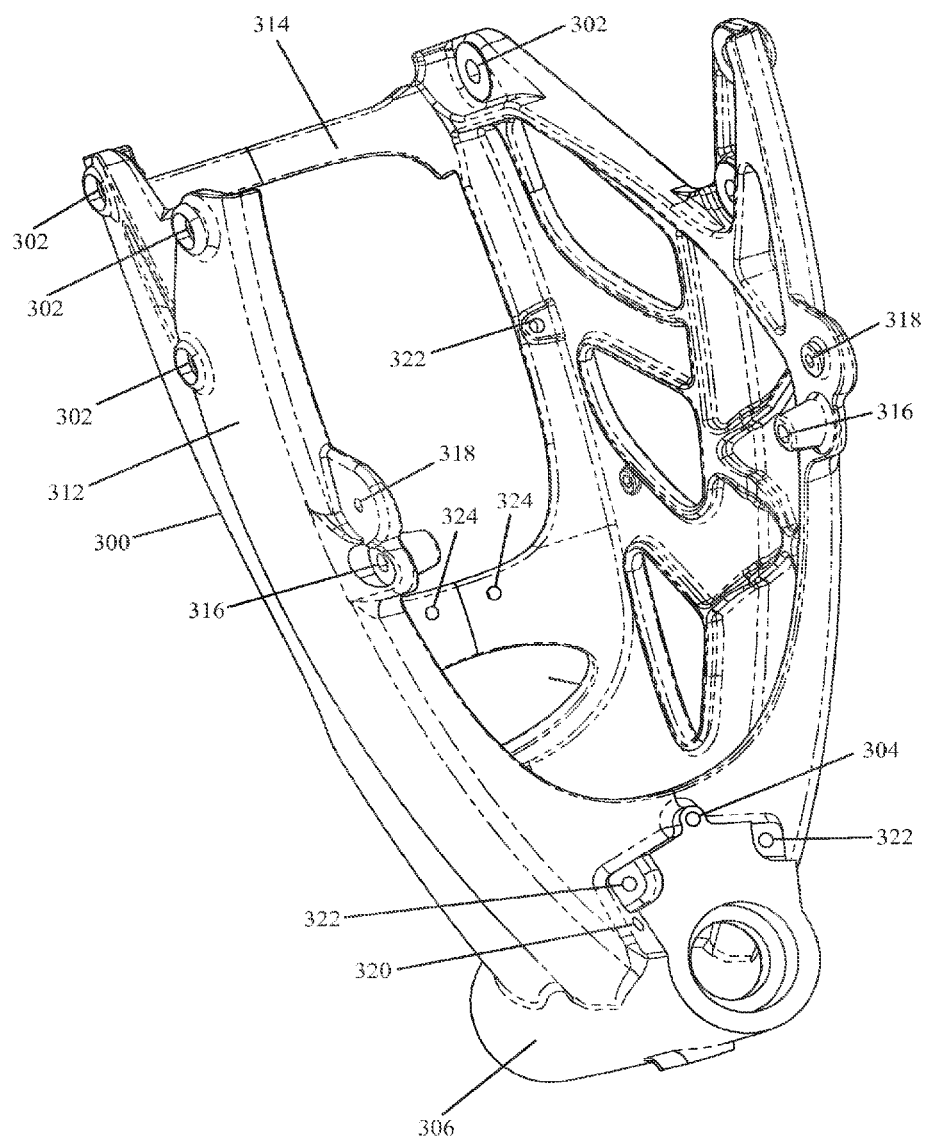
FIG. 9 shows a front part of a motorcycle frame.

FIG. 9 shows a front part of a motorcycle frame 144. The second frame structure 300 includes frame mounts 302, shroud mounts 304, a headstock structure 306, a left side 312, a structural rib 314, battery box mounts 316, skid plate mounts 318, steering stop mounts 320, radiator mounts 322, seat plate mounts 324, and an access hole 328. The headstock structure 306 may receive a fork 134. The left and right sides 312, 310 are attached to the headstock structure 306. A structural rib 314 attaches to the left and right sides 312, 310, aids in structural rigidity, and helps keep the left and right sides 312, 310 in place during the casting and finish machining process. The seat plate mounts 324 may receive a plate or clip that receives the seat 114. The access hole 328 can allow access to the radiator fill cap. The battery box mounts 316 may receive a battery box 112. The skid plate mounts 318 may receive a skid plate 142. The steering stop mounts 320 may receive steering stops. The radiator mounts 322 may receive a radiator 104.

In addition to having the ability to cool the motor with a coolant, the frame 144 itself can act as a heat sink. Aluminum is a very good heat conductor, and the shape of the frame structure 200 allows excess head to travel from the motor housing 244 to the left and right sides 242, 240 of the frame structure 200 where the heat may be dissipated via air convection, conduction to attached parts, or radiation.

The left and right sides 242, 240 of the frame structure 200 as shown in FIGS. 4-7 comprise a perimeter frame construction to allow for the connection of parts including the rear swingarm 138, rear suspension linkage 130, rear shock 140, rear subframe 116, and fork 134. Alternate constructions include a trellis frame construction and a composite frame construction.

REFERENCE NUMERALS 100 motorcycle
102 shroud
104 radiator
106 steering dampener
108 steering stop
110 skid plate
112 battery box
114 seat
116 rear subframe
118 shock
120 gear cover
122 motor cover
124 rear master cylinder
126 foot peg
128 water pump
130 rear suspension linkage
134 fork
136 sprocket
138 swing arm
140 shock
142 skid plate
144 frame
200 frame structure
202 frame mount
204 shock mount
206 gear cover mount
208 rear subframe mount
210 linkage mount
212 rear master cylinder mount
214 battery bolt hole
216 skid plate mount
218 footpeg mount
220 rear brake lever mount
222 shroud mount
224 motor cover mount
226 pass through hole
228 swing arm mount
230 top coolant port
232 oil sump
234 drain plug port
236 water pump mount
238 bottom coolant port
240 right side
242 left side
244 motor housing
246 output shaft housing
248 vent hole
250 structural rib
252 battery box mount
254 shock mount bolt hole
300 second frame structure
302 frame mount
304 shroud mount
306 headstock tube
308 vent hole
310 right side
312 left side
314 structural rib
316 battery box mount
318 skid plate mount
320 steering stop mount
322 radiator mount
324 seat plate mount
326 mounting plane
328 access hole

What is claimed is:

1. An electric motorcycle frame comprising:
a headstock configured to connect a front suspension to the electric motorcycle frame;
a first side structure connected to the headstock, the first side structure including a first opening;
a second side structure connected to the headstock, the second side structure including a first opening; and
a torsion tube configured to house an electric motor, the torsion tube including a first end and a second end, wherein the first end of the torsion tube is connected to the first opening of the first side structure and the second end of the torsion tube is connected to the first opening of the second side structure.

2. The electric motorcycle frame of claim 1, wherein the electric motorcycle frame is cast to include the first opening in the first side structure and the first opening in the second side structure.

3. The electric motorcycle frame of claim 1, wherein the first end of the torsion tube is connected to the first opening of the first side structure by being inserted into the first opening and wherein the second end of the torsion tube is connected to the first opening of the second side structure by being inserted into the first opening.

4. The electric motorcycle of claim 1, wherein the torsion tube includes at least one coolant port configured to circulate coolant between the torsion tube and the electric motor.

5. The electric motorcycle of claim 1, wherein the torsion tube includes an opening configured for wiring to pass through the electrical motorcycle frame, the wiring connected to the electric motor.

6. The electric motorcycle frame of claim 1, wherein the first side structure includes a second opening and the second side structure includes a second opening.

7. The electric motorcycle frame of claim 6, further comprising:
    a second torsion tube configured to house an output shaft, the second torsion tube including a first end and a second end, wherein the first end of the second torsion tube is connected to the second opening of the first side structure and the second end of the second torsion tube is connected to the second opening of the second side structure.

8. The electric motorcycle frame of claim 1, further comprising:
    a structural rib coupling together the first side structure and the second side structure.

9. The electric motorcycle frame of claim 8, further comprising:
    a shock mount connected to the structural rib, the shock mount configured to connect a rear suspension to the electric motorcycle frame.

10. The electric motorcycle frame of claim 1, wherein the first side structure includes a subframe mount and the second side structure includes a subframe mount.

11. The electric motorcycle frame of claim 10, further comprising:
    a subframe connected to the subframe mount of the first side structure and the subframe mount of the second side structure.

12. The electric motorcycle frame of claim 1, further comprising:
    a swing arm pivot mount positioned between the first side structure and the second side structure.

13. The electric motorcycle frame of claim 12, wherein the torsion tube is positioned in the electric motorcycle frame between a position of the headstock and a position of the swing arm pivot mount.

14. The electric motorcycle frame of claim 1, wherein the first side structure includes at least one battery box mount and the second side structure includes at least one battery box mount.

15. The electric motorcycle frame of claim 1, further comprising:
    a battery box connected to the battery box mount of the first side structure and the battery box mount of the second side structure.

* * * * *